United States Patent [19]

Robertson et al.

[11] Patent Number: 5,419,962
[45] Date of Patent: May 30, 1995

[54] BONDED FIBROUS CASING SUBSTRATES AND METHOD OF MAKING SAME

[75] Inventors: Diane M. Robertson, West Shuffield; Patrick G. Fay, Enfield; Ludmila Byalik, West Hartford; Ronald H. Pomeroy, Windsor Locks, all of Conn.

[73] Assignee: The Dexter Corporation, Windsor Locks, Conn.

[21] Appl. No.: 180,141

[22] Filed: Jan. 11, 1994

Related U.S. Application Data

[62] Division of Ser. No. 755,121, Sep. 5, 1991, Pat. No. 5,300,319.

[51] Int. Cl.$^6$ .................. A22C 13/00; B32B 33/00; B32B 27/04
[52] U.S. Cl. .................. 428/348; 428/288; 428/289; 428/290; 138/118.1; 138/128; 138/153; 206/802; 426/105; 426/129; 426/138
[58] Field of Search .......... 428/34.8, 288, 289, 428/290; 138/118.1, 128, 153; 206/802; 426/105, 129, 138

[56] References Cited

U.S. PATENT DOCUMENTS

| | | | |
|---|---|---|---|
| 1,818,874 | 8/1931 | Ulrich | 427/243 |
| 1,947,096 | 2/1934 | McCulloch | 427/326 |
| 2,822,298 | 2/1958 | Merrifield | 427/243 |
| 3,378,379 | 4/1968 | Shiner et al. | 99/176 |
| 3,640,735 | 2/1972 | Oppenheimer et al. | 99/171 |
| 4,125,430 | 11/1978 | Grossman | 428/243 |
| 4,952,431 | 8/1990 | Robertson et al. | 428/34.8 |
| 5,063,104 | 11/1991 | Robertson et al. | 428/286 |
| 5,096,754 | 3/1992 | Hammer et al. | 428/34.8 |

FOREIGN PATENT DOCUMENTS

| | | |
|---|---|---|
| 4002083A1 | 8/1991 | Germany . |
| 862671 | 3/1961 | United Kingdom . |
| 2241254A | 8/1991 | United Kingdom . |

OTHER PUBLICATIONS

European Search Report for EP 92 30 7939.

*Primary Examiner*—Charles R. Nold
*Attorney, Agent, or Firm*—Chilton, Alix & Van Kirk

[57] ABSTRACT

A porous fibrous sheet material for use in the manufacture of food casings and the like is pressed prior to bonding and is bonded with about 10% by weight or less of a non-viscose bonding agent. The pressed and bonded material can be used to form casings having characteristics of thinness and elasticity similar to the thinness and elasticity of viscose-bonded casings, without the environmental problems associated therewith. The non-viscose bonding agent will result in significantly less shrinkage in the base web than results from viscose bonding.

20 Claims, No Drawings

BONDED FIBROUS CASING SUBSTRATES AND METHOD OF MAKING SAME

This is a divisional of application Ser. No. 07/755,121 filed Sep. 5, 1991 and issued as U.S. Pat. No. 5,300,319 on Apr. 5, 1994.

BACKGROUND OF THE INVENTION

The present invention relates generally to casings used for packaging food products such as sausage and the like. More particularly it is concerned with a non-viscose-bonded fibrous base web used in making reinforced casing, and a method of making the non-viscose-bonded fibrous base web.

Heretofore it has been the practice to make reinforced films, tubing, casings or skins for food products and the like by the encasement of bonded fibrous base papers or substrates in a film forming material. The substrate must have good absorptivity to provide for proper penetration of the encasing material. In order to withstand the treatment conditions at the time of encasement, the substrate must possess substantial wet and dry strength. Furthermore, when a caustic encasing medium such as viscose is used, the substrate must have sufficient caustic strength to enable it to retain its structural integrity during casing-forming operations. Heretofore substrates of this type frequently have been prepared by bonding a preformed and dried paper or fibrous base web with a dilute (1%) viscose solution followed by the steps of drying, regenerating the cellulose, washing and redrying. This bonding operation using the dilute viscose solution is sufficient to impart to the substrate adequate caustic resistance, and to allow the substrate to retain its porous, absorbent characteristics in order to result in complete impregnation and encasement by the concentrated viscose solution. Typically the casing-forming operation includes the steps of forming the substrate into a cylindrical tube, impregnating and encasing the substrate tube with a highly caustic viscose solution, regenerating the impregnate with acid, washing to remove excess acid and viscose, and drying the final reinforced film or casing. This process is set forth in greater detail in U.S. Pat. No. 3,135,613, Underwood, entitled "Impregnated Paper Webs and Method of Making Sausage Casing Thereof", thus clarifying the sequential evolution of the base web through the bonded substrate phase and then into the reinforced casing.

The casings produced in the manner set forth possess sufficient elasticity and burst resistance to be particularly well suited for enclosing meat and other food products that are injected into the interior of the tubes under pressure. Furthermore, they are sufficiently thin to allow proper drying of the tube during manufacture, and to provide for good through-sheet viscose penetration under rapid encasement operations, favorable shirring characteristics, and acceptable clarity of appearance. The viscose-bonded, viscose-encased casings thereby provide firm, uniform enclosures for well known products such as sausage, bologna and the like as well as other food products.

However, due to the environmental concerns associated with the use of viscose, various patents subsequent to the aforementioned U.S. Pat. No. 3,135,613 are directed toward the use of alternative materials for bonding the paper webs to provide appropriate casing substrates. In selecting bonding materials other than the commercially employed acid-regenerated dilute viscose, it is important that the bonding materials meet both the processing and performance requirements of the food casings to be produced therefrom. The substrate must retain its porous, absorbent characteristics in order to permit complete impregnation and encasement by the concentrated viscose solution. This is necessary in order to impart the required specific physical properties to the finished tube which make it an effective casing, or other end-use product. These physical properties include adequate strength and tube stretch during the stuffing, cooking and curing operation to ensure that the casing expands (or shrinks) to the required diameter, necessary clarity of appearance and a lack of unsightly artifacts. In addition, the initial base substrate must be thin enough to allow for proper drying of the tube during manufacture and for sufficient through-sheet viscose penetration under dynamic conditions. The substrate also should result in a casing having favorable shirring and other convertibility characteristics.

The characteristics described above have been embodied in the traditional viscose binder. The alternate binders that have been tried, however, have met with varying degrees of success. While certain of the chemical characteristics of viscose have been mimicked by alternative binders, viscose has thus far been unique in the magnitude of its three-dimensional shrinkage during regeneration, producing a uniquely thin sheet while maintaining its extensibility and other above-mentioned characteristics without further treatment. The use of a non-viscose-bonded substrate which is generally thicker than the conventional viscose-bonded substrate can result in poor viscose penetration under rapid encasement processes as well as poor shirring characteristics of the final casing, and can lead to drying problems and/or the appearance of artifacts on the casing. Furthermore, when alternative binders are used, in order to compensate for the lack of shrinkage and the resulting thicker paper product, it may be necessary to reconfigure or modify the equipment that is used during encasement, or to alter the encasement process itself such as by decreasing viscose viscosity or increasing dwell times, the latter reducing productivity. Furthermore, a casing formed from a viscose-bonded sheet has a characteristic high extensibility (as the tube is being expanded) which generally cannot be matched by alternate bonding systems. Thus, a reconfiguration or modification of equipment used in stuffing operations may be required to accommodate a non-viscose-bonded casing, or, in order to expand to the same final diameter as the naturally stretchy viscose-bonded casing, the paper might have to have a larger initial width than a viscose-bonded casing paper. Such reconfiguration or modification of converting equipment can be expensive and inconvenient, requiring shut-down of operations.

SUMMARY OF THE INVENTION

An object of the present invention is to provide a bonded fibrous base substrate which has the characteristics heretofore associated with the dilute (1%) viscose-bonded material, but does not have the environmental problems associated with viscose. Included in this object is the provision of a bonded fibrous base substrate which is useful to make food casings and the like which are thin and have good elasticity, acceptable strength, and minimal discoloration.

Another object of the invention is to provide a new and improved method of producing a bonded fibrous base substrate which does not contain viscose and is useful to make food casings.

Yet another object of the invention is to provide a pre-pressed, non-viscose-bonded substrate which can be substituted directly for a viscose-bonded substrate in the manufacture of food casings, requiring little or no modification of the equipment or processes used for encasement, or for stuffing operations.

Other objects will be in part obvious and in part pointed out more in detail hereinafter.

These and related objects and advantages of the invention are realized by providing a pre-compressed, bonded porous fibrous sheet material which does not contain viscose, the sheet material being useful for the manufacture of food casings and the like. The sheet material contains a fibrous base web which is pre-pressed, i.e., pressed before it is bonded. The pre-pressed web is bonded with about 10% by weight or less of a non-viscose bonding agent which is characterized by its ability to impart less shrinkage to the bonded sheet material upon drying than the shrinkage imparted by a viscose bonding agent. The pre-pressed, bonded fibrous base web, which preferably has a thickness of no more than about 135% of the thickness of a viscose-bonded sheet having a corresponding basis weight, can be used to manufacture food casings and the like which have characteristics of thinness, elasticity, strength and clarity which render them useful as substitutes for casings formed from viscose-bonded sheet material. Preferably the bonded substrate is used to form a casing having an elasticity comparable to the elasticity of a casing formed from a viscose-bonded sheet material which has a corresponding basis weight after bonding.

The sheet material of the invention is formed by providing a base web material which preferably will result in a bonded sheet having a basis weight of about 15-35 grams per square meter, pre-pressing the base web material to a pressed thickness which is not less than the final thickness of the treated sheet after drying, treating the pressed base web material with a non-viscose bonding solution effective to bond the base web material, the bonding agent being characterized by its ability to impart less shrinkage to the bonded sheet material than the shrinkage imparted by a viscose bonding agent, and then drying the pressed and treated web. Due to the step of pressing the web prior to bonding, the non-viscose-bonded, dried web is useful to form casings which have characteristics of thinness and elasticity comparable to the thinness and elasticity of casings formed from viscose-bonded webs which have corresponding basis weights after bonding.

The invention accordingly comprises the several steps and the relation of one or more of such steps with respect to each of the others and the article possessing the features, properties, and relation of elements exemplified in the following detailed disclosure.

DETAILED DESCRIPTION OF THE INVENTION

According to the present invention, a porous bonded fibrous base web having the foregoing and related advantages can be achieved by pre-pressing an unbonded fibrous base web to a predetermined thickness, and then subsequently bonding it with a bonding agent which comprises a film forming material that will impart to the base web substantial strength while permitting the rapid penetration of that solution into the substrate structure. The combination of the pre-pressing step and subsequent bonding with the film forming material results in a base web that can be used to form a casing having properties of thinness and elasticity comparable to the thinness and elasticity obtained when conventional viscose binder is used without pressing. The base web material of the invention can be used to make a variety of food casings and the like, including casings that are formed without necessitating substantial alterations in the equipment or techniques that are employed in conventional methods of encasing viscose-bonded substrates with a highly caustic viscose solution. The base web material of the invention also can be used in conjunction with encasement processes which do not use viscose as the encasing medium.

Briefly, the process of the invention preferably comprises the steps of forming a dilute suspension of cellulosic fibers, such as manila hemp fibers, and thereafter forming a fibrous base web from the suspension. The base web is pre-pressed to a desired thickness which is not less than the final thickness of the sheet material, is dried, is subsequently bonded using a bonding agent which will impart less shrinkage to the bonded sheet material upon drying than the shrinkage imparted by a viscose bonding agent and will result in a base web having sufficient strength and absorptivity to be used in the formation of a casing, and is dried again. A one-step or multi-step bonding process can be used.

The base web is generally composed of the natural fibers of pure cellulose and preferably comprises the long, light weight and nonhydrated fibers of the Musa Textilis species, typical of which are hemp fibers. Webs made from this material are generally soft, porous papers of uniform texture and thickness and possess tensile strength ratios close to unity, that is, a substantially equal tensile strength in both the machine and transverse direction. However, it will be appreciated that the tensile ratio may vary from about 0.5 to about 1.5 where such is desired. Webs also can include other natural fibers such as sisal or wood pulp, and synthetic fibers such as rayon.

The base web can be pre-pressed using any technique which will effectively reduce the thickness of the paper a predetermined amount, e.g., to a pre-bonded thickness that will result in a bonded, dried substrate having a "target" thickness which is comparable to the thickness of a viscose-bonded web. The pressing may be conducted in a single stage or multi-stage process. Preferred pressing methods include wet pressing and calendering. However, other pressing techniques which achieve the desired result also are within the scope of the invention. Wet pressing preferably is conducted prior to drying the web, but alternatively can be conducted after rewetting a dried web, in which case a size press, or a series of size presses, can be used. During conventional wet pressing, the sheet is transferred between two rolls having predetermined hardness and camber which are loaded on the ends to provide the required pressing pressure. In addition, the sheet is usually supported by felts on one or both sides to absorb the water removed from the web. Typical wet press loads for a web having a basis weight of 15-35 grams per square meter for a single stage pressing step are 5-200 pounds per lineal inch (p.l.i.), however, higher or lower pressures may be required. The load will depend upon the moisture content of the paper fibers, the type of fiber, subsequent bonding agent, and encasing material, the desired properties of the final casing, and the type of pressing equipment that is used. According to the invention, the preferred pressure for wet pressing is within the range of 25-75 p.l.i., and more preferably is about 25-60 p.l.i. When the web is calendered using a conventional calendar, the pressure required to achieve a desired reduction in sheet thickness is likely to be substantially higher than that applied in wet pressing, because the paper is dry. For example, calendering pressures typically range from 75 to 700 p.l.i., preferably 85-400 p.l.i., and more preferably 90-300 p.l.i. Size pressing ordinarily will require more pressure than wet pressing in order to achieve the same final thickness because the moisture content of the fiber passed into a size press is usually lower than the moisture content of fiber sent into a wet press.

With any pressing technique that is used, it is important that the pressing occur prior to bonding in order to result in a casing having an elasticity (stretch) comparable to that of a casing formed from a viscose-bonded substrate. While the relationship between the step of pressing the web before bonding and the result of good elasticity of the casing is not fully understood, it is believed that pressing before bonding does not reduce the elasticity of the material because it does not interrupt binder-to-fiber bonding. On the other hand, pressing after bonding can interrupt binder-to-fiber bonding, resulting in a reduction in elasticity of the casing product. It is also possible that pre-pressing provides less interruption to fiber-to-fiber bonding than the interruption that occurs when pressing is conducted after bonding.

According to a preferred embodiment of the invention, the web is pressed to a pre-bonded thickness that will result in the production of a bonded, dried substrate having a desired "target" thickness. The thickness to which the pre-bonded web is pressed depends upon the degree to which the web will shrink (or expand) as a result of application of the bonding agent. Example 1 below shows the shrinkage of unpressed webs bonded with a variety of different binders, some of which cause greater shrinkage of the web than others. For commercial production of casings, it often is necessary to obtain a bonded substrate having a very precise thickness, e.g., a value within several microns of the target thickness. The appropriate pre-bonding thickness which will result in a substrate of the "target" thickness is preferably determined empirically, as the amount of shrinkage of the substrate upon drying after bonding will depend in part upon the degree to which the web is pressed before bonding.

Typical thicknesses of bonded, dried substrates produced according to the invention range from about 55-150 microns, preferably 60-130 microns, and more preferably 70-120 microns. The thicknesses of the substrates before bonding can be up to at least about 200 microns. According to the invention, when a pre-pressed, non-viscose-bonded substrate is to be substituted for a viscose-bonded substrate, and is subsequently to be encased with a suitable encasing material, such as viscose, it is preferred that the thickness of the bonded, dried substrate is no more than about 135% of the thickness of a viscose-bonded substrate, more preferably is no more than about 120%, and most preferably no more than about 110% of the thickness of a viscose-bonded substrate. Similar percentages are likely to apply when non-viscose encasement processes are used. Ideally, when the non-viscose substrate is to be substituted directly for a viscose-bonded substrate, the web should be pressed to a thickness that will result in a dried, bonded substrate having a thickness within about 15 microns, more preferably within about 10 microns, and most preferably within about 3 microns of the target thickness for the viscose-bonded substrate.

As indicated above, the pre-pressed, non-viscose-bonded substrate must have sufficient strength in order to serve as a substitute for a viscose-bonded substrate. It is noted that the threshold value of strength appears to be met without difficulty using the binders of the invention. Preferably the bonding agent should improve the secure adhesion of the casing forming material to the reinforced substrate since it is believed that secure bonding therebetween contributes to the burst strength of the resultant casing. At the same time, it should be kept in mind that the web should be devoid, at least as far as possible, of impregnates that might interfere with both the absorption and bonding mechanism. It is therefore necessary that the bonding agent utilized cause as little resistance as possible to the penetration of the casing forming coating into the reinforcing substrate material.

Although the bonding agent can be applied to the base web using various standard application techniques, it is generally preferred that the bonding agent be incorporated into the base web material by immersing the web in an aqueous solution of the bonding material and subsequently drying the treated web. In other words, it is generally preferred that the bonding be carried out by dip coating in the aqueous binder solution to apply an appropriate coating level of the binder material thereon. The dip coating can be applied by any conventional method, such as by using a size press with relatively low pressure. The treated web is then dried after each bonding stage, or is otherwise treated to fix the binder in the web.

As mentioned, the bonding can be effected in a one-step or multi-step process. In a one-step process, a film forming bonding agent can be employed alone, however, it preferably is combined with an insolubilizing or cross-linking agent which provides improved physical and chemical properties during the casing forming operation. A preferred bonding agent for a one-step process is a mixture of poly(vinyl alcohol) as a film-forming material, and a polyamide epichlorohydrin as a cross-linking agent.

Multi-step processes are preferred over one-step processes when the compounds which are used to effect bonding cannot effectively be mixed in a single solution, or when certain desired properties cannot otherwise be achieved. Multi-step processes generally involve the use of film forming materials and/or cross-linking agents applied in successive stages. Generally, after each step of a multi-step bonding process, the web is dried. A wide variety of multi-step processes can be used. One of the two-step processes which has been found particularly useful when the substrate is to be subsequently encased in viscose involves, as a first step, treating the base web with a film forming bonding agent, and after drying the web, treating the web with a mixture of a film forming bonding agent and a cross-linking agent or an insolubilizing agent. A three-step process which provides particularly favorable results involves treating the base web with a cross-linking agent and subsequently drying the web, treating the web with a film forming agent, followed by a second drying stage, and, thirdly, treating the base web with an insolubilizing agent.

The film forming materials preferably used according to the present invention are thermoplastic and/or thermosetting polymers, as well as other polymers and their corresponding salts. Preferred film forming materials include poly(vinyl alcohol), chitosans, i.e., deacetylated chitins, including polymers formed by the reaction of chitin (a high molecular weight linear polymer of anhydro-N-acetyl-glucosamine) with concentrated alkali, such as those sold under the trade name "SeaSanMer N2000" by CTC Organics of Atlanta, Ga., polyacrylamides, alginates, such as sodium alginates sold by Merck & Co., Kelco Division under the trade name "Kelgin", cellulose based materials such as carboxymethyl cellulose, methyl cellulose, hydroxy ethyl cellulose, hydroxypropyl methyl cellulose, and hydroxypropyl cellulose, cationic and anionic starches, acrylic latexes, modified proteins such as casein or soy, vinyl acetate ethylene emulsions, and vinyl acrylic emulsions.

The insolubilizing agents or cross-linking agents employed can be thermosetting resins curable under acid or alkaline conditions, or can fall into other categories, such as metal salts and multivalent metal ion complexes. Cationic wet strength resins have proved satisfactory from the standpoint of caustic resistance when used in conjunction with a film forming material, and have resulted in strengths for the casings that are comparable to or exceed those obtained by the previously employed dilute viscose bonding treatment. The preferred insolubilizing or cross-linking agents are polymeric reaction products of epichlorodydrin and polyamides, dialdehydes, urea formaldehyde, melamine formadehyde, and glyoxylated polyacrylamides. Useful material other than thermosetting resins include multivalent metal ion complexes such as ammonium zirconium carbonate, calcium citrate and the like, and inorganic salts such as calcium chloride, sodium tetraborate and aluminum sulfate. When epichlorohydrin is used, it preferably is included in amounts sufficient to convert the secondary amine groups therein to tertiary amines. Generally polyamides from polyalkylene polyamines and saturated or unsaturated aliphatic or aromatic polycarboxylic acids containing from about three to ten carbon atoms are preferred. A typical example of such a material is the water soluble thermosetting cationic epichlorohydrin-polyamide reaction product sold by Hercules Incorporated of Wilmington, Del. under the trade names "Kymene 557H", "Kymene 2064", "Kymene LX" and the like. Other commercially available agents include styrene-maleic anhydride copolymers sold by Monsanto Plastics and Resins Company under the trademark "Scripset", and a polyamide-type resin sold by Borden Chemical Division of Borden, Inc. under the trademark "Cascamid C-12".

The amount of film forming material and, optionally, cross-linking agent used in a bonding solution will vary depending on the desired properties of the substrate, and in some cases, will depend upon the number of steps in the bonding process. For any given combination of binder ingredients, a useful proportion of the various components is best determined empirically. When poly(vinyl alcohol) is used as a film-forming agent, its concentration can be up to 15% by weight in solution but is usually less than 5% by weight and typically falls within the range of from about 0.7% to 4% by weight. The insolubilizing agents are employed as dilute aqueous solutions and each are present at concentrations of less than about 5% by weight in the paper and, in some instances, as low as 0.2%, either alone or in combination with a film forming solution. Typically, when used in a one-step process, a film former and an insolubilizing agent each are present at solution concentrations between 0.2% and 4% with the ratio of insolubilizing agent to film former falling within the range of from about 1 to 10 to about 1 to 1. As will be appreciated, the concentration of the specific materials utilized will depend upon the ability of that material to achieve the desired wet strength characteristics and absorption at the concentration levels employed. Typically, when poly(vinyl alcohol) is used as a film forming agent in a one-step binding process, the amount by weight of solution of cross-linking agent will exceed 0.1% and preferably falls within the range of 0.2–1.5% by weight, with the ratio of poly(vinyl alcohol) to cross-linking agent being within the range of 1:1 and 6:1, and preferably within the range of 5:4 to 5:1. For example, the preferred poly(vinyl alcohol) to cross-linking agent ratio within a bonding solution according to the invention is about 3:1 to 2:1.

In the processes described above, "poly(vinyl alcohol)" as used herein is intended to cover solutions of vinyl polymers where the poly(vinyl alcohol) moiety constitutes up to 100% of the vinyl polymer present in the solution. Since poly(vinyl alcohol) is normally prepared by hydrolysis of polyvinyl esters such as poly(vinyl acetate), the degree of substitution will vary and the hydroxyl content may vary substantially. Accordingly, when the substrate is to be encased in viscose, it is generally preferred that the material exhibits the requisite effects of imparting caustic strength. This may be achieved in a one-step process at poly(vinyl alcohol) levels of 25% and less but preferably at levels where the polymer is predominantly poly(vinyl alcohol), that is, where poly(vinyl alcohol) levels are at least 50% and preferably about 80% or greater. Although various commercial products are available, it has been found that excellent results are obtained when using a high molecular weight, (i.e., having a solution viscosity at 4 wt % solids of about 40 centipoise or greater, typically 45–70 centipoise), fully hydrolyzed (98–99% hydrolysis) aqueous poly(vinyl alcohol) solution such as the material sold by Air Products Co. under the trademark "Airvol 350" or the super hydrolyzed (99+% hydrolysis) solutions sold under the trademark "Airvol 165".

In a two-step process using a film forming material in the first step and a combination of a film forming material and a cross-linking agent in the second step, the proportion of first stage to second stage film forming material does not appear to significantly affect the end result. Excellent results have been achieved with a ratio of first stage to second stage film forming material ranging from about 3 to 1 to about 1 to 3.

The final casing can be made in accordance with conventional casing techniques. In contrast to a 10% or less pickup of binder by the base web material, the casing forming operation results in not only absorption of the casing forming solution within the substrate, but also results in the complete encasement of the substrate by the film forming material. Thus, the relative proportion of the casing film to the substrate on a weight basis is at least about 1:1, and can be as high as 5:1. Thus the resultant casing product is, in effect, a film of the casing forming material reinforced by a bonded fibrous substrate fully embedded therein.

In a preferred embodiment of the one-step bonding process, the first stage film forming material consists of an aqueous solution of 1–4 wt % of a mixture containing poly(vinyl alcohol), epichlorohydrin (Kymene 557H), and surfactant.

Preferred embodiments of two-step bonding processes include a first dip in sodium alginate (Kelgin) and epichlorohydrinpolyamide reaction product (Kymene 557H), and, after drying, a second dip in calcium chloride, or, alternatively, a first dip in a solution containing chitosan (for example, SeaSanMer N2000) and, after drying, a second dip in a cross-linking agent such as a glyoxylated polyacrylamide. For example, the two-step bonding process can be a first dip in 0.5-3 wt % Kelgin XL and 0.3-1 wt % Kymene 557H, followed by a second dip in 0.2-5 wt % calcium chloride.

In a preferred embodiment of a three-step bonding process, the first stage is a dip in an epichlorohydrin-polyamide reaction product (Kymene 557H), followed by drying. The second stage involves treatment in a film forming solution of sodium alginate (Kelgin XL) followed by drying, and the third stage involves treatment in an aqueous solution of calcium chloride or other calcium salts. A particularly preferred process of this type involves 0.5-2 wt % Kymene 557H, 1-3 wt % Kelgin XL, and 0.2-5 wt % calcium chloride.

In both one-step and multi-step bonding processes, it is advantageous to add to the binder solution very small amounts of a surfactant as an absorption aid. In this connection materials such as the nonionic alkylaryl polyether alcohols may be used, as well as nonylphenoxy, poly(ethyleneoxy) ethanols, block copolymers of ethylene oxide and propylene oxide, dodecyl phenoxy poly (ethyleneoxy) ethanols, polyethylene glycol ethers, polyethylene glycol esters, ethoxylated alkyl phenols and alcohols, cellulose ethers, polyalkylene glycols, polyoxyalkylene glycols, alkylaryl polyether alcohols, polyoxethylene sorbitan moonolaurate and monoleate, alkylaryl polyethoxy ethanols, propylene glycols, and polyethylene oxide resins. The surfactants preferably are used in the dilute binder solution in concentrations below 2% by weight and, in fact, at concentrations below 0.5% and preferably less than 0.1% so as to avoid loss of wet strength in the bonded substrate. The type of surfactant which is used generally will not adversely affect the properties of the final casing product as long as it is used in an appropriate amount. Typically, surfactants are used in concentrations of about 0.01 to 0.05% by weight. Below this level, the water climb characteristics of the substrate are not positively affected.

In one-step and multi-step processes, the coated and dried substrate evidences a binder pickup of about 10% by weight or less, with the amount of binder typically falling within the range of 0.5 to 8% by weight. Best results are achieved when the binder pickup is about 2.0 to 6.5% by weight of the bonded substrate. The bonded substrate preferably retains a high degree of its porous, absorbent character in order to permit impregnation and encasement during the final casing forming operation. Generally the porosity of the pre-pressed and bonded substrate can be measured in accordance with TAPPI test method T251-pm-75 and exhibits a Gurley porosity greater than 275 liters/minute. The porosity will vary with the weight of the pre-pressed and bonded base web, and typically falls within the range of about 300 to 1000 liters/minute. Lighter sheets will of course have a higher porosity while heavier weight materials exhibit lower porosities. The thickness of the dried, bonded substrate will depend upon the thickness and type of base web which is used, the degree to which the web is pressed, the pressing technique, the type and quantity of binder, and the bonding technique. Other conditions such as the humidity of the environment also effect web thickness.

A positive correlation between the suitability of a substrate for encasement and the wet and dry strength, caustic strength, wet and dry elongation, and water climb of the substrate is not known to exist. However, it is generally, although not always, the case that a bonded, fibrous substrate having, by way of example, a basis weight of 23.7 g.s.m. and a relatively low level of binder add-on has a cross-directional wet strength of about 500 g/25 mm or more, a cross-directional dry strength of about 2000 g/25 mm or more, and a water climb of 50 seconds or less. When the bonded substrate is to be encased in viscose, the substrate often, although not necessarily, requires a caustic strength of about 300 g/25 mm or more. Higher values probably would be obtained for substrates having higher basis weights and/or containing larger amounts of binder. Lower values may be obtained for substrates having lower basis weights and/or smaller amounts of binder.

As mentioned, the pre-pressed, non-viscose-bonded substrate of the invention can be used to form a casing product having properties of elasticity, thinness, burst strength and clarity of appearance comparable to those of a casing made from a viscose-bonded substrate. Therefore, in many instances, the substrate permits stuffing and further processing to be conducted without requiring modification of the pre-stuffed size of the casings. The measured burst strength of a casing will depend upon many factors, including the composition of the substrate and encasing medium, the diameter of the casing, and the method used to measure burst strength. For example, for a casing formed from a viscose-bonded substrate of 25.4 grams per square meter (g.s.m.) of 100% hemp fiber having a diameter of about 60 mm, the burst strength, measured in the laboratory as in Example 2 below, is likely to be at least about 9 p.s.i. Frequently, it is necessary to achieve nearly the same degree of burst strength and elasticity in a casing formed from a non-viscose-bonded substrate as is obtained when a casing is formed from a substrate bonded with viscose. However, the range of acceptable values of burst strength and elasticity will depend upon the intended use of the non-viscose-bonded casing. Generally, for a meat casing formed from a non-viscose-bonded fibrous substrate which is to be substituted directly for a viscose-bonded substrate, a burst strength of at least 80% of the burst strength of a meat casing made from a viscose-bonded casing is preferred, and a burst strength of at least 90% of the burst strength of a viscose-bonded casing is particularly preferred. Furthermore, an elasticity which is at least 90%, preferably at least 95%, and more preferably at least 98% of the elasticity of a viscose-bonded casing is desired. Casings having an elasticity within about 99.5% of the elasticity of a casing formed from a viscose-bonded substrate of the same basis weight have been found to be particularly useful as substitutes for casings formed from viscose-bonded substrates. However, the required minimum values of elasticity and burst strength will vary depending upon the amount of stretch to be applied to the casing during the stuffing operation.

It is noted that the process of the invention is effective for resulting in a finished casing regardless of the encasing medium. Thus, while conventional viscose can be used as the encasing medium, other compounds, including without limitation poly(vinyl alcohol) and cellulose carbamate can be used with or without cross-linking and insolubilizing agents.

As will be appreciated the characteristics of the bonded substrate also render the substrate suitable for use as teabag paper, particularly for herbal teas.

Having generally described the invention, the following examples are included for purposes of illustration so that the invention may be more readily understood and are in no way intended to limit the scope of the invention unless otherwise specifically indicated. All amounts are on a weight basis unless otherwise specified.

In the series of Examples set forth, the base fibrous web material consisted of 100% hemp fiber sheet material.

EXAMPLE 1

This example illustrates the difference in shrinkage imparted to an unpressed substrate bonded with viscose, as contrasted to the shrinkage of unpressed substrates bonded with various non-viscose bonding agents.

In parts A–E set forth below, the base fibrous web material consisted of machine formed sheets having a basis weight of 25.4 grams per square meter. Each sheet was approximately 8 inches by 10 inches. The bonding agent was applied to the sheets in the laboratory.

Part A

A dry, unbonded sheet of the standard base web material having a thickness of 145 microns was dipped in an aqueous bonding solution containing 1% viscose. The sheet was subsequently dried, regenerated, washed and redried in a conventional manner. The thickness of the sheet after redrying was 103 microns. The percent change in sheet thickness is recorded in Table I.

Part B

A dry, unbonded sheet of the standard base web material having a thickness of 143 microns was dipped into an aqueous bonding solution containing 2% poly(vinyl alcohol) (Airvol 165), 0.5% epichlorohydrin-polyamide reaction product (Kymene 557H), and 0.04% surfactant, and was subsequently dried. The thickness of the sheet after drying was 132 microns. The percent change in sheet thickness is recorded in Table I.

Part C

A dry, unbonded sheet of the standard base web material having a thickness of 146 microns was treated as in Part B, except that a different bonding solution was used. The bonding solution contained 1.7% carboxymethyl cellulose, 0.7% epichlorohydrin-polyamide reaction product (Kymene 557H) and 0.04% surfactant. The thickness of the sheet after drying was 128 microns. The percent change in sheet thickness is recorded in Table I.

Part D

A dry, unbonded sheet of the standard base web material having a thickness of 146 microns was dipped into a first aqueous bonding solution of 2% sodium alginate (Kelgin XL), combined with 20% sodium hexamethaphosphate based on the weight of sodium alginate as a sequestrant, and 0.7% epichlorohydrin-polyamide reaction product (Kymene 557H). The sheet was dried, subsequently was dipped into an aqueous insolubilizing solution containing 1% calcium chloride, and was dried again. The thickness of the sheet after the final drying step was 127 microns. The percent change in sheet thickness is recorded in Table I.

Part E

A dry, unbonded sheet of the standard base web material having a thickness of 145 microns was treated as in Part D, with the exception that the first bonding solution consisted of an aqueous solution of 0.5% chitosan (SeaSanMer N2000) and the second cross-linking solution consisted of an aqueous solution of 1.2% glyoxylated polyacrylamide (Parez 631NC). The thickness of the sheet after drying was 119 microns. The percent change in sheet thickness is recorded in Table I.

Parts A–E of Example 1 show that viscose-bonded paper exhibits a substantially higher degree of shrinkage in thickness than non-viscose binders. Poly(vinyl alcohol) exhibits the least amount of shrinkage of the binders shown. Thus, it is likely that a web to be bonded with poly(vinyl alcohol) will require more pressing than a web bonded with any of the non-viscose binders used in Parts C–E to the same pre-dried thickness in order to achieve a dried substrate having a particular target thickness.

TABLE I

Comparative Shrinkage of Bonded Paper

| | Bonding Solution | % Decrease in Thickness |
|---|---|---|
| A | Viscose | 28 |
| B | 2% poly(vinyl alcohol) 0.5% cross-linking agent 0.04% surfactant | 8 |
| C | 1.7% carboxymethyl cellulose 0.7% cross-linking agent 0.04% surfactant | 12 |
| D | 2% sodium alginate 0.7% cross-linking agent followed by 1% $CaCl_2$ | 13 |
| E | 0.5% chitosan followed by 1.2% glyoxylated polyacrylamide | 18 |

EXAMPLES 2–10

Examples 2–10 illustrate the favorable property of elasticity of casings formed from substrates that are pressed prior to bonding with a bonding solution. Furthermore, Examples 2–10 show that pressing a substrate prior to bonding does not adversely affect the burst strength of a tube formed from the bonded substrate. It is noted that each substrate that was pressed prior to bonding had acceptable clarity of appearance.

EXAMPLE 2

As a control, a machine-formed, unbonded sheet of the standard base fibrous web material having a basis weight of about 25.4 grams per square meter after treatment with binder was bonded using an aqueous solution containing 1% by weight viscose. After regenerating, washing and drying, the sheet was encased on one side with viscose in the laboratory. The substrate was encased using a single-side encasement process which involved cutting the bonded paper to a length of 12½ inches in the machine direction and a width of 8 inches in the cross direction. An edge of the sheet of paper in the cross direction was then taped to the top edge of a smooth glass plate. A bead containing 7% viscose was poured onto the paper at the tape line, and was drawn down in the machine direction using a stainless steel rod, thereby forming a film of viscose about 0.4–1.5 mm thick on the paper. A portion of the coated sample was cut from the tape, pulled off the glass, and wrapped around a mandrel having diameter of 57–59 mm. The tube and mandrel were placed in a coagulation bath for ten minutes, removed, and then placed in a regeneration bath for ten minutes. The tube was then quickly rinsed, removed from the mandrel, washed and dried.

The casing product was tested for percent change in tube diameter from a relaxed state to the point of burst (elasticity), and for burst strength. The test properties are set forth in Table II.

EXAMPLE 3

A machine-formed, unbonded sheet of standard base fibrous web material was wet pressed, dried, and was subsequently bonded with a bonding agent consisting of an aqueous solution containing 2% by weight poly(vinyl alcohol) (Airvol 165), 0.5% by weight epichlorohydrin-polyamide reaction product (Kymene 557H), and 0.04% surfactant. The bonded sheet had the same basis weight as the bonded sheet used in Example 2. The sheet was dried, and subsequently was encased in viscose on one side in the same manner as the viscose-bonded substrate of Example 2. The casing product was dried and was tested for percent change in tube diameter to burst and burst strength. The test properties are set forth in Table II. The elasticity of the casing formed from a pre-pressed, poly(vinyl alcohol) bonded substrate was even higher than the elasticity of the control casing formed from a viscose-bonded substrate in Example 2. The burst strength of the casing also was higher than the burst strength of the control casing of Example 2.

EXAMPLE 4

The process of Example 3 was repeated with the exception that instead of being wet pressed the sheet was dried and calendered before it was bonded. The test properties of the casing are shown on Table II. The elasticity and burst strength of the encased tube formed from a pre-pressed, poly(vinyl alcohol) bonded substrate were higher than the elasticity and burst strength of the control tube of Example 2.

EXAMPLE 5

The process of Example 4 was repeated with the exception that instead of being calendered, the sheet was dried and was then pressed wet after drying and before bonding. As shown in Table II, the percent change in diameter of the tube to the point of bursting was almost as large as the corresponding change of the control tube of Example 2. Furthermore, the burst strength was high enough to render the casing useful as a substitute for the control tube of Example 2.

EXAMPLE 6

The process of Example 4 was repeated with the exception that the calendering step took place after bonding instead of before bonding. The test properties are set forth in Table II. It is noted that the elasticity of the tube formed from a substrate that was calendered after bonding is substantially lower than the elasticity of the control tube of Example 2, rendering the tube unacceptable as a substitute for the control tube.

EXAMPLE 7

The process of Example 3 was repeated with the exception that the wet pressing step occurred after bonding instead of before bonding. The test properties are set forth in Table II. The tube had lower elasticity than the control tube of Example 2, rendering it unacceptable as a substitute for the control tube.

TABLE II

| | | | Comparative % Change in Diameter and Burst Strength of 25.4 gsm Paper Coated On One Side | | | | |
|---|---|---|---|---|---|---|---|
| Example Number | Pressing Technique | Bonding Agent | Initial Diameter (mm) | Diameter at Burst (mm) | Change in Diameter (mm) | % Change in Diameter | Burst Strength (psi) |
| 2 | None | Viscose | 61.1 | 69.4 | 8.3 | 13.6 | 15.9 |
| 3 | Wet Press before drying and bonding | poly(vinyl alcohol mix | 64.7 | 75.1 | 10.4 | 16.1 | 16.4 |
| 4 | calendar after drying but before bonding | poly(vinyl alcohol mix | 57.0 | 66.3 | 9.3 | 16.3 | 16.0 |
| 5 | Wet press after drying and before bonding | poly(vinyl alcohol mix | 63.8 | 71.7 | 7.9 | 12.4 | 14.8 |
| 6 | calendar after bonding | poly(vinyl alcohol mix | 64.2 | 70.5 | 6.3 | 9.8 | 14.7 |
| 7 | Wet press after bonding | poly(vinyl alcohol mix | 59.5 | 66.3 | 6.8 | 11.4 | 13.7 |

EXAMPLE 8

As a control, a casing was made from an unpressed, viscose-bonded substrate having a thickness comparable to the sheet of Example 1, Part A. The encasement process was identical to the single-side encasement process of Examples 2–7 with the exception that the sheet was further encased with viscose on a second side in the laboratory. In order to coat the second side of the paper, i.e., the side next to the plate, a thin film of viscose was drawn down the glass plate, the bonded paper was then placed on the film, and the second thin film of viscose was drawn down the outer side of the sheet. The casing was tested for percent change in tube diameter until burst and burst strength. The test properties are set forth in Table III.

EXAMPLE 9

A sheet of standard base fibrous web material having the same basis weight after bonding as the web material of Example 8 was wet pressed and was subsequently bonded by dipping it in a solution of 2% poly(vinyl alcohol) (Airvol 165), 0.5% epichlorohydrin-polyamide reaction product (Kymene 557H), and 0.03% surfactant. The thickness of the pressed and bonded sheet after drying and before encasement was substantially the same as that of Example 8. The test properties of the encased sheet are set forth in Table III. The casing had even higher values of elasticity and burst strength than the control casing of Example 8.

For purposes of comparison, a casing was formed from an unpressed substrate bonded with the polyvinyl alcohol mixture. While the casing was found to exhibit values of elasticity and burst strength comparable to those of a viscose-bonded casing, the thickness of the unpressed substrate was too high to render the casing useful as a substitute for the control casing, as it would result in poor viscose penetration upon encasement and the presence of unsightly artifacts.

EXAMPLE 10

The process of Example 9 was repeated with the exception that instead of wet pressing the sheet before bonding, the sheet was bonded, dried, and then calendered. The calendered sheet had a thickness comparable to that of the control of Example 8. The test properties are set forth in Table III. This example shows that when pressing occurs after bonding, the elasticity of the final casing is insufficient to render the casing useful as a substitute for a casing formed from a viscose-bonded substrate.

TABLE III

| | Comparative % Change in Diameter and Burst Strength of 25.4 gsm Paper Coated on Two Sides | | | | | |
|---|---|---|---|---|---|---|
| Example Number | Pressing Technique | Bonding Agent | Initial Diameter (mm) | Diameter at Burst (mm) | Change in Diameter (mm) | % of Change in Diameter | Burst Strength (psi) |
| 8 | None | 1% Viscose | 59.2 | 65.1 | 5.9 | 10.0 | 15.1 |
| 9 | Wet press before drying and bonding | poly(vinyl) alcohol mix | 59.2 | 65.7 | 6.5 | 11.0 | 17.8 |
| 10 | calender after bonding | poly(vinyl) alcohol mix | 59.3 | 64.2 | 4.9 | 8.3 | 14.75 |

As will be apparent to persons skilled in the art, various modifications and adaptations of the structure above described will become readily apparent without departure from the spirit and scope of the invention, the scope of which is defined in the appended claims.

What is claimed is:

1. A pre-compressed and bonded sheet material that does not contain viscose, the sheet material being suited for use as a substrate in the manufacture of food casings and comprising a porous fibrous sheet material bonded with about 10% by weight or less of a non-viscose bonding agent wherein the bonding agent is characterized by its ability to impart less shrinkage to the bonded sheet material upon drying than the shrinkage imparted by a viscose bonding agent, the sheet material having a basis weight of 15–35 grams per square meter and having been pressed at a rate of at least 5 pounds per lineal inch prior to bonding to provide a bonded sheet material having a thickness which is no more than 135% of the thickness of a viscose-bonded porous fibrous sheet material of the same fiber composition that has a corresponding basis weight after bonding, the sheet material being adapted to form a casing having an elasticity of at least about 90% of the elasticity of a casing formed from a viscose-bonded sheet material of the same fiber composition that has a corresponding basis weight after bonding.

2. The sheet material of claim 1, wherein the elasticity of a casing made therefrom is at least 95% of the elasticity of a casing formed from a viscose-bonded sheet material.

3. The sheet material of claim 1, wherein the thickness is no more than 120% of the thickness of the viscose-bonded porous fibrous sheet material.

4. The sheet material of claim 1, wherein the thickness is about 55–150 microns.

5. The sheet material of claim 1, wherein the non-viscose bonding agent comprises a film forming material selected from the group consisting of polyvinyl alcohol, sodium alginate, and the reaction product of a high molecular weight linear polymer of anhydro-N-acetyl-glucosamine and a concentrated alkali.

6. The sheet material of claim 1, wherein the bonding agent further comprises a cross-linking agent selected from the group consisting of glyoxylated polyacrylamide, the reaction product of epichlorohydrin and a polyamide, and a bivalent metal salt.

7. The sheet material of claim 5, wherein the bonding agent further comprises a surfactant.

8. The sheet material of claim 1, wherein the bonding agent comprises a film forming material and a cross-linking agent.

9. The sheet material of claim 1, wherein the bonding agent comprises a film forming material.

10. The sheet material of claim 3, wherein the bonding agent comprises a film forming material and a cross-linking agent.

11. The sheet material of claim 1, wherein the sheet material has a porosity of at least 300 liters/minute and a caustic strength of at least 300 grams/25 mm.

12. A food casing comprising a fibrous substrate embedded within and reinforcing a casing film, the substrate comprising a pre-compressed porous fibrous sheet material that does not contain viscose and which is bonded with about 10% by weight or less of a non-viscose bonding agent characterized by its ability to impart less shrinkage to the bonded sheet material upon drying than the shrinkage imparted by a viscose bonding agent, the sheet material having a basis weight of 15–35 grams per square meter and having been pressed at a rate of at least 5 pounds per lineal inch prior to bonding to provide a bonded sheet material having a dried thickness of no more than 135% of the thickness of a viscose-bonded, dried porous fibrous sheet material of substantially the same fiber composition that has a corresponding basis weight after bonding, the casing having an elasticity of at least about 90% of the elasticity of a casing formed from a viscose-bonded sheet material of the same fiber composition that has a corresponding basis weight after bonding.

13. The casing of claim 12, wherein the casing has an elasticity of at least 95% of the elasticity of a casing formed from a viscose-bonded sheet material that has a corresponding basis weight after bonding.

14. The casing of claim 12, wherein the sheet material has a thickness that is no more than 120% of the thickness of a viscose-bonded porous fibrous sheet material that has a corresponding basis weight after bonding.

15. The sheet material of claim 2, wherein the thickness is no more than 120% of the thickness of the viscose-bonded porous fibrous sheet material.

16. The sheet material of claim 15, wherein the thickness is about 55–150 microns.

17. The sheet material of claim 15, wherein the non-viscose bonding agent comprises a film forming material selected from the group consisting of polyvinyl alcohol, sodium alginate, and the reaction product of a high molecular weight linear polymer of anhydro-N-acetyl-glucosamine and a concentrated alkali.

18. The sheet material of claim 2, wherein the thickness is no more than 110% of the thickness of the viscose-bonded porous fibrous sheet material.

19. The sheet material of claim 5, wherein the thickness is no more than 110% of the thickness of the viscose-bonded porous fibrous sheet material.

20. A pre-compressed and bonded sheet material that does not contain viscose, the sheet material being suited for use as a substrate in the manufacture of food casings and comprising a porous fibrous sheet material bonded with about 10% by weight or less of a non-viscose bonding agent wherein the bonding agent is characterized by its ability to impart less shrinkage to the bonded sheet material upon drying than the shrinkage imparted by a viscose bonding agent, the sheet material having a basis weight of 15–35 grams per square meter and a thickness which is no more than 135% of the thickness of a viscose-bonded porous fibrous sheet material of the same composition that has a corresponding basis weight after bonding, the sheet material being adapted to form a casing having an elasticity of at least about 90% of the elasticity of a casing formed from a viscose-bonded sheet material of the same fiber composition that has a corresponding basis weight after bonding.

* * * * *